(12) United States Patent
Nishikawa et al.

(10) Patent No.: US 9,866,028 B2
(45) Date of Patent: Jan. 9, 2018

(54) POWER CONTROL APPARATUS, POWER CONTROL METHOD, PROGRAM, AND ENERGY MANAGEMENT SYSTEM

(71) Applicant: OMRON Corporation, Kyoto-shi, Kyoto (JP)

(72) Inventors: Takeo Nishikawa, Kyoto (JP); Takuya Nakai, Hirakata (JP); Makoto Ohashi, Uji (JP); Junichiro Yamada, Kizugawa (JP); Wataru Okada, Kizugawa (JP)

(73) Assignee: OMRON Corporation, Kyoto-shi (JP)

( * ) Notice: Subject to any disclaimer, the term of this patent is extended or adjusted under 35 U.S.C. 154(b) by 299 days.

(21) Appl. No.: 14/742,755

(22) Filed: Jun. 18, 2015

(65) Prior Publication Data

US 2015/0333524 A1 Nov. 19, 2015

Related U.S. Application Data

(63) Continuation of application No. PCT/JP2013/056411, filed on Mar. 8, 2013.

(30) Foreign Application Priority Data

Dec. 28, 2012 (JP) ................................ 2012-288919

(51) Int. Cl.
*H02J 3/38* (2006.01)
*H02J 3/32* (2006.01)
(Continued)

(52) U.S. Cl.
CPC ................ *H02J 3/383* (2013.01); *H02J 3/32* (2013.01); *H02J 7/007* (2013.01); *H02J 7/34* (2013.01);
(Continued)

(58) Field of Classification Search
CPC .......... H02J 13/0096; H02J 7/007; H02J 7/34; H02J 7/35; H02J 3/32; H02J 3/38;
(Continued)

(56) References Cited

U.S. PATENT DOCUMENTS 6,081,104 A * 6/2000 Kern ..................... H02J 9/065
320/101
2015/0001932 A1* 1/2015 Inoue ..................... G05F 1/67
307/24

FOREIGN PATENT DOCUMENTS

JP H11-046458 A 2/1999
JP 2011-091985 A 5/2011
(Continued)

*Primary Examiner* — Jared Fureman
*Assistant Examiner* — Rafael Pacheco
(74) *Attorney, Agent, or Firm* — Metrolexis Law Group, PLLC

(57) ABSTRACT

A power control apparatus includes: a first conversion apparatus that applies DC/DC conversion to direct current power from a power generator for generating power using natural energy, and outputs the resultant power; a second conversion apparatus that applies DC/DC conversion to the power output from the first conversion apparatus and charges a power storage unit with the resultant power, and also applies DC/DC conversion to power from the power storage unit and discharges the resultant power; a third conversion apparatus that supplies alternating current power to a power system and an alternating current load by applying DC/AC conversion to the power output from the first conversion apparatus and/or the power discharged by the second conversion apparatus; and a controller that causes the second conversion apparatus to perform the discharge so that the power output from the third conversion apparatus is higher than power consumed by the alternating current load.

15 Claims, 16 Drawing Sheets

(51) Int. Cl.
  *H02J 7/00*    (2006.01)
  *H02J 13/00*   (2006.01)
  *H02J 7/35*    (2006.01)
  *H02J 7/34*    (2006.01)

(52) U.S. Cl.
  CPC ............ *H02J 7/35* (2013.01); *H02J 13/0096* (2013.01); *Y02E 10/563* (2013.01); *Y02E 10/566* (2013.01); *Y02E 70/30* (2013.01); *Y10T 307/367* (2015.04)

(58) Field of Classification Search
  CPC ..... Y02E 70/30; Y02E 10/566; Y02E 10/563; Y10T 307/367; H01L 31/042
  See application file for complete search history.

(56) References Cited

FOREIGN PATENT DOCUMENTS

| | | |
|---|---|---|
| JP | 2012-139019 A | 7/2012 |
| JP | 2012-222908 A | 11/2012 |
| WO | 2011051772 A1 | 5/2011 |

\* cited by examiner

POWER CONTROL APPARATUS, POWER CONTROL METHOD, PROGRAM, AND ENERGY MANAGEMENT SYSTEM

CROSS REFERENCE TO RELATED APPLICATIONS

This application is a Continuation of PCT Application No. PCT/JP2013/056411 filed on Mar. 8, 2013, and claims the priority of Japanese Patent Application No. 2012-288919 filed on Dec. 28, 2012, entitled "POWER CONTROL APPARATUS, POWER CONTROL METHOD, PROGRAM, AND ENERGY MANAGEMENT SYSTEM," the entire contents of both of which are incorporated herein by reference.

FIELD

The present disclosure relates to a power control apparatus, a power control method, a program, and an energy management system. In particular, the present disclosure relates to a power control apparatus, a power control method, a program, and an energy management system that enable more efficient use of generated power.

BACKGROUND

Conventionally, development of an energy management system that performs optimum power management has been taking place in order to efficiently use power supplied from a plurality of power sources, e.g., power from a power system that supplies commercial power, power generated through photovoltaics, and power reserved in a battery.

For example, JP 2012-139019A discloses a configuration of a power conditioner that realizes effective use of generated power by charging a storage battery with the generated power at the time of output suppression control.

FIGS. 1 and 2 show exemplary configurations of an energy management system.

As shown in FIGS. 1 and 2, an energy management system 11 is formed by connecting a power control apparatus 12 to a power system 14 via an ammeter 13, and connecting a photovoltaic (PV) device 15, a battery 16, and an alternating current (AC) load 17 to the power control apparatus 12.

The power control apparatus 12 includes a PV-use DC/DC converter 21, a DC/AC converter 22, a battery-use DC/DC converter 23, and a controller 24. An AC-side terminal of the DC/AC converter 22 is connected to the power system 14 and the AC load 17. On the other hand, a DC-side terminal of the DC/AC converter 22 is connected to the PV device 15 via the PV-use DC/DC converter 21, and to the battery 16 via the battery-use DC/DC converter 23. Hereinafter, wiring which is connected to the DC-side terminal of the DC/AC converter 22 and via which direct current power is supplied between the PV-use DC/DC converter 21 and the battery-use DC/DC converter 23 is referred to as a DC bus 25.

The controller 24 controls the PV-use DC/DC converter 21, the DC/AC converter 22, and the battery-use DC/DC converter 23 in accordance with a condition of the energy management system 11.

In the energy management system 11, as indicated by an arrow A in FIG. 1, the PV-use DC/DC converter 21 applies DC/DC conversion to power generated by the PV device 15 and supplies the resultant power to the DC/AC converter 22 via the DC bus 25, and then the DC/AC converter 22 applies DC/AC conversion to the supplied power and supplies the resultant power to the AC load 17. Excess power is supplied to the power system 14 (reverse power flow).

In a case where the battery 16 is charged with power generated by the PV device 15 via the PV-use DC/DC converter 21, the DC bus 25, and the battery-use DC/DC converter 23, as indicated by an arrow B in FIG. 2, the battery-use DC/DC converter 23 applies DC/DC conversion to the power that is stored in the battery 16 as a result of the charge and supplies the resultant power to the DC/AC converter 22 via the DC bus 25, and then the DC/AC converter 22 applies DC/AC conversion to the supplied power and supplies the resultant power to the AC load 17. Excess power is supplied to the power system 14 (reverse power flow).

With such a reverse flow of power generated by the PV device 15 to the power system 14, the power is sold. A user who owns the power control apparatus 12 can earn a profit from selling the power.

JP 2012-139019A is an example of background art.

SUMMARY

However, in the case of FIG. 1, if power generated by the PV device 15 is low relative to power consumed by the AC load 17, the generated power is entirety consumed by the AC load 17, that is to say, the generated power cannot be sold. Furthermore, if power generated by the PV device 15 is low, the efficiency of conversion to alternating current power decreases, and the conversion loss increases.

On the other hand, in the case of FIG. 2, power that is stored in the battery 16 as a result of charge for the purpose of, for example, avoiding the output suppression is entirely consumed by the AC load 17, that is to say, cannot be sold, unless it is discharged at an appropriate timing.

As indicated above, in some cases, power generated by the PV device is not efficiently used depending on power consumed by the load and a discharge timing.

The present disclosure has been made in view of the above conditions, and aims to enable more efficient use of generated power.

A power control apparatus according to one aspect of the present disclosure includes: a first conversion apparatus that applies DC/DC conversion to direct current power from a power generator for generating power using natural energy, and outputs the resultant direct current power; a second conversion apparatus that applies DC/DC conversion to the power output from the first conversion apparatus and charges a power storage unit with the resultant power, and also applies DC/DC conversion to power from the power storage unit and discharges the resultant power; a third conversion apparatus that supplies alternating current power to a power system and an alternating current load by applying DC/AC conversion to one or both of the power output from the first conversion apparatus and the power discharged by the second conversion apparatus; and a controller that controls driving of the first to third conversion apparatuses. The controller causes the second conversion apparatus to perform the discharge so that the power output from the third conversion apparatus is higher than power consumed by the alternating current load.

A power control method or a program according to one aspect of the present disclosure is a power control method for a power control apparatus or a program executed by a computer that controls the power control apparatus, the power control apparatus including: a first conversion apparatus that applies DC/DC conversion to direct current power from a power generator for generating power using natural energy, and outputs the resultant direct current power; a second conversion apparatus that applies DC/DC conversion to the power output from the first conversion apparatus and charges a power storage unit with the resultant power, and also applies DC/DC conversion to power from the power storage unit and discharges the resultant power; and a third conversion apparatus that supplies alternating current power to a power system and an alternating current load by applying DC/AC conversion to one or both of the power output from the first conversion apparatus and the power discharged by the second conversion apparatus. The power control method or the program includes a step of causing the second conversion apparatus to perform the discharge so that the power output from the third conversion apparatus is higher than power consumed by the alternating current load.

An energy management system according to one aspect of the present disclosure includes: a power generator that generates power using natural energy; a power storage unit for storing power; a direct current bus serving as a path for supplying direct current power; a first conversion apparatus that applies DC/DC conversion to direct current power from the power generator and outputs the resultant direct current power; a second conversion apparatus that applies DC/DC conversion to the power output from the first conversion apparatus and charges the power storage unit with the resultant power, and also applies DC/DC conversion to power from the power storage unit and discharges the resultant power; a third conversion apparatus that supplies alternating current power to a power system and an alternating current load by applying DC/AC conversion to one or both of the power output from the first conversion apparatus and the power discharged by the second conversion apparatus; and a controller that controls driving of the first to third conversion apparatuses. The controller causes the second conversion apparatus to perform the discharge so that the power output from the third conversion apparatus is higher than power consumed by the alternating current load.

In one aspect of the present disclosure, the second conversion apparatus performs the discharge so that the power output from the third conversion apparatus is higher than the power consumed by the alternating current load.

According to one aspect of the present disclosure, generated power can be used more efficiently.

DETAILED DESCRIPTION

The following describes a specific embodiment incorporating the present technique in detail with reference to the drawings.

[Exemplary Configuration of Energy Management System]

Figure 1:
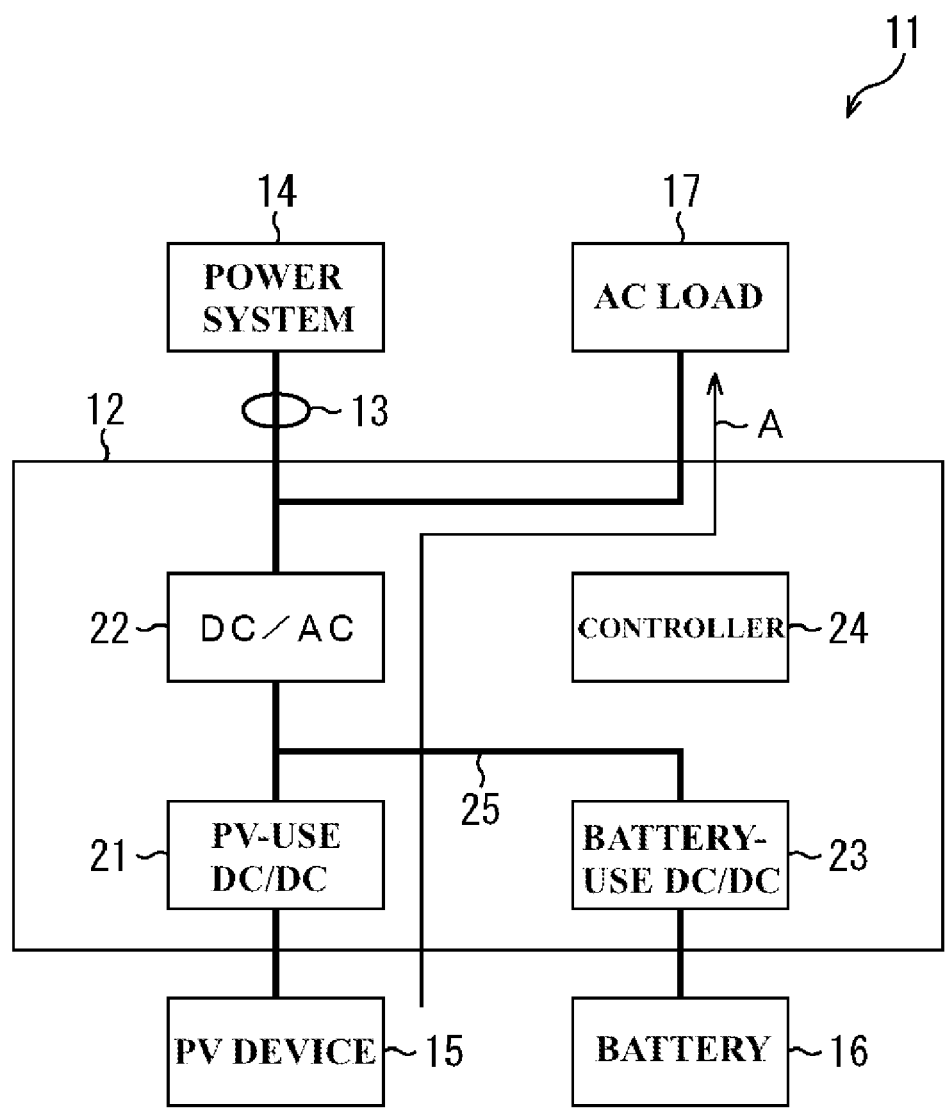
FIG. 1 shows the flow of power in an energy management system.
Figure 2:
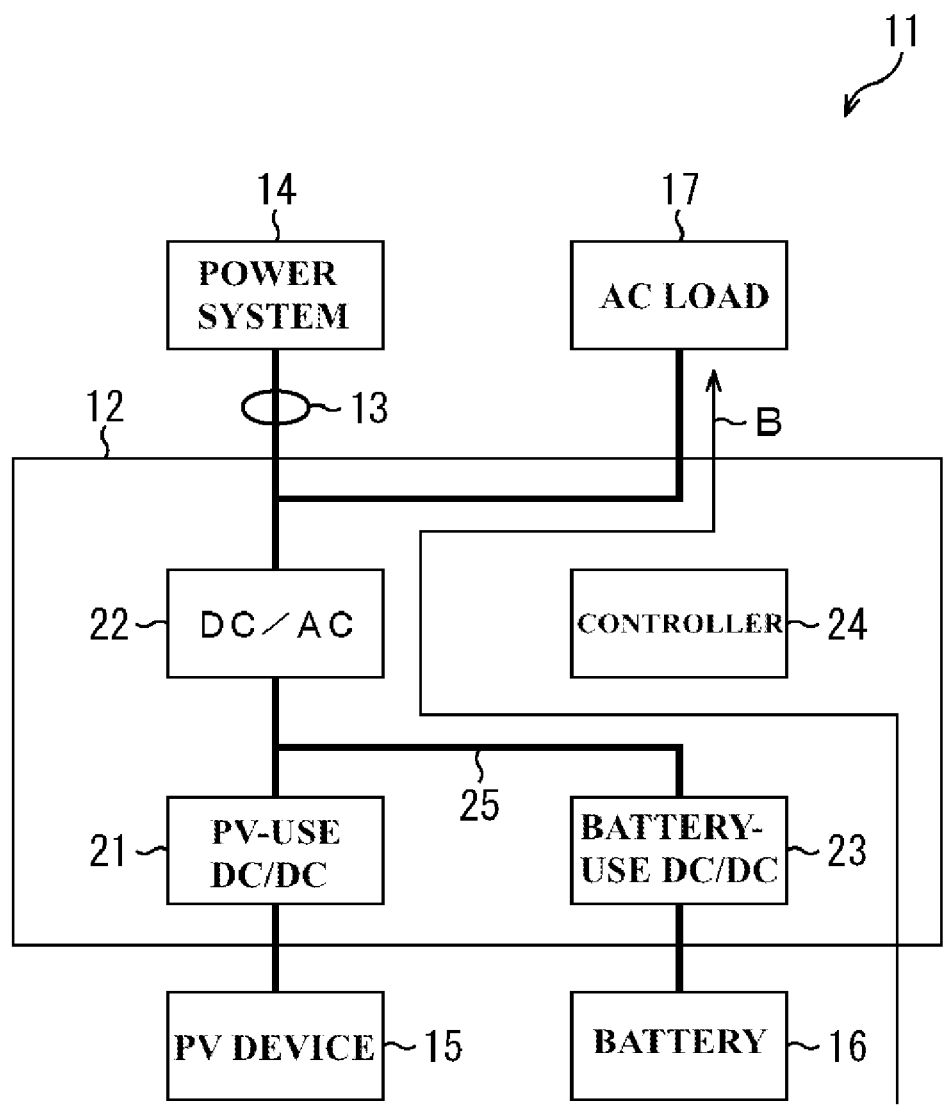
FIG. 2 shows the flow of power in an energy management system.
Figure 3:
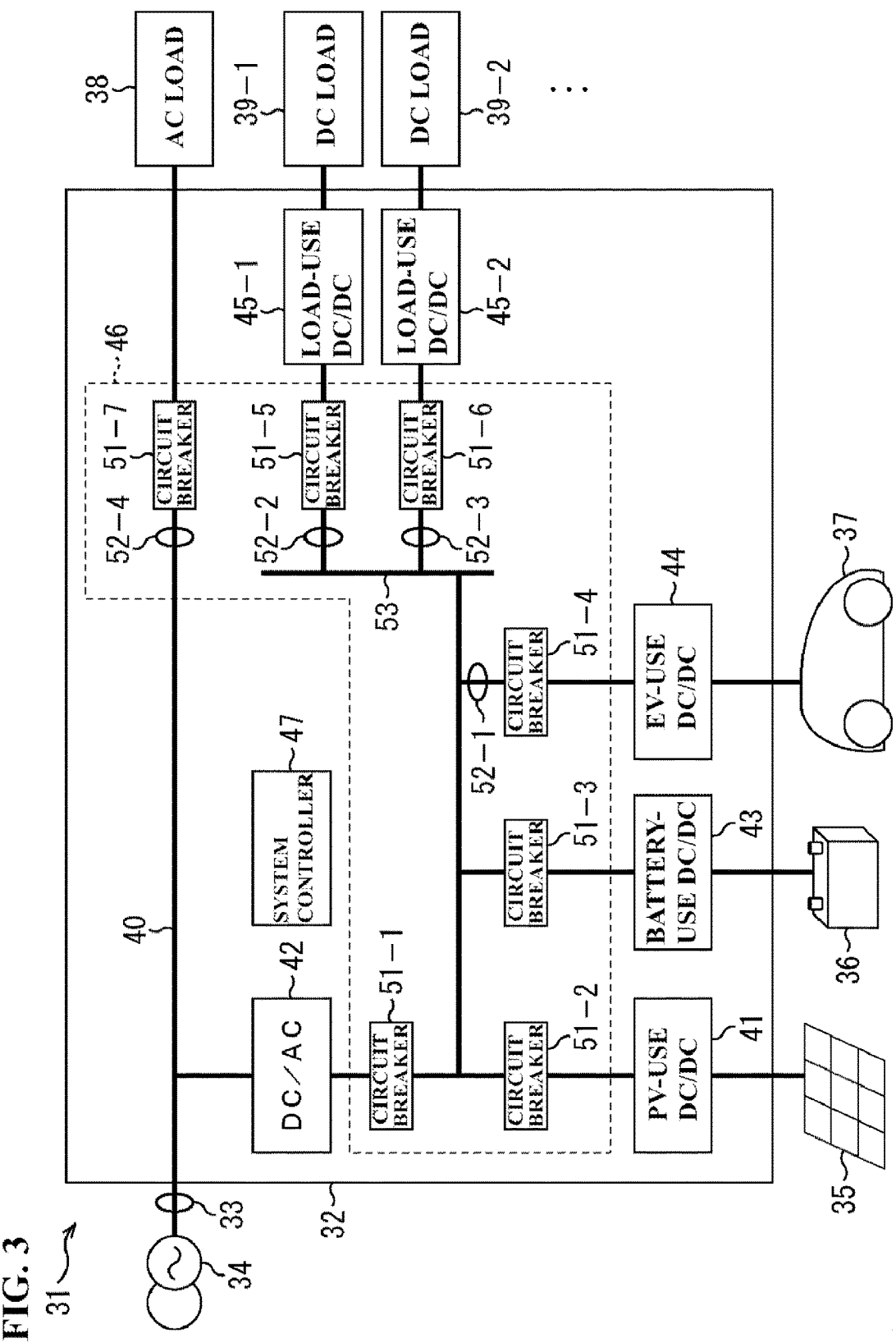
FIG. 3 is a block diagram showing an exemplary configuration of an embodiment of an energy management system incorporating the present technique.

FIG. 3 is a block diagram showing an exemplary configuration of an embodiment of an energy management system incorporating the present technique.

In FIG. 3, an energy management system 31 is formed, as a photovoltaic system, by connecting a power control apparatus 32 to a power system 34 via an ammeter 33, and connecting a PV device 35, a battery 36, an electric vehicle (EV) 37, an AC load 38, and DC loads 39-1 and 39-2 to the power control apparatus 32.

The power control apparatus 32 is formed as a so-called power conditioner, and performs control to supply power supplied from a plurality of power sources (the PV device 35, the battery 36, and the EV 37) connected to the power control apparatus 32 to a plurality of loads (the AC load 38 and the DC loads 39-1 and 39-2) connected to the power control apparatus 32.

The ammeter 33 measures power that is supplied from the power control apparatus 32 to the power system 34 (reverse power flow). The energy management system 31 supplies alternating current power to the power system 34.

The PV device 35 is formed like, for example, a panel with a plurality of photovoltaic cell modules connected thereto. The PV device 35 generates power in accordance with the amount of received sunlight, and supplies the generated power to the power control apparatus 32. The battery 36 stores power supplied from the power control apparatus 32, and supplies stored power to the power control apparatus 32. The EV 37 is connected to the power control apparatus 32 as appropriate for use of the EV 37 by a user, and has a built-in battery that stores power supplied from the power control apparatus 32.

The AC load 38 is a device that is driven while consuming alternating current power. The DC loads 39-1 and 39-2 are devices that are driven while consuming direct current power. Although two DC loads 39-1 and 39-2 are connected to the power control apparatus 32 in the exemplary configuration shown in FIG. 3, the number of DC loads can be increased or reduced.

The power control apparatus 32 includes a PV-use DC/DC converter 41, a DC/AC converter 42, a battery-use DC/DC converter 43, an EV-use DC/DC converter 44, load-use DC/DC converters 45-1 and 45-2, a distribution board 46, and a system controller 47. The distribution board 46 houses circuit breakers 51-1 to 51-6, ammeters 52-1 to 52-4, and a DC bus 53.

In the power control apparatus 32, an AC-side terminal of the DC/AC converter 42 is connected to a power line 40 that connects the power system 34 and the AC load 38, and a DC-side terminal of the DC/AC converter 42 is connected via the circuit breaker 51-1 to a DC bus 53 that serves as a path for supplying direct current power. The PV device 35 is connected to the PV-use DC/DC converter 41 that is connected via the circuit breaker 51-2 to the DC bus 53. Similarly, the battery 36 is connected to the battery-use DC/DC converter 43 that is connected via the circuit breaker 51-3 to the DC bus 53, and the EV 37 is connected to the EV-use DC/DC converter 44 that is connected via the circuit breaker 51-4 and the ammeter 52-1 to the DC bus 53.

The DC load 39-1 is connected to the load-use DC/DC converter 45-1 that is connected via the circuit breaker 51-5 and the ammeter 52-2 to the DC bus 53, and the DC load 39-2 is connected to the load-use DC/DC converter 45-2 that is connected via the circuit breaker 51-6 and the ammeter 52-3 to the DC bus 53. The AC load 38 is connected via the circuit breaker 51-7 and the ammeter 52-4 to the DC/AC converter 42.

The PV-use DC/DC converter 41 applies DC/DC conversion to power generated by the PV device 35 (increases and reduces voltage thereof) so that the resultant power has a predetermined voltage, and outputs the resultant power to the DC bus 53. The PV-use DC/DC converter 41 can perform MPPT control in which the maximum output point is tracked so as to obtain maximum power from the PV device 35.

The DC/AC converter 42 applies DC/AC conversion to direct current power supplied via the DC bus 53. Via the power line 40, the DC/AC converter 42 supplies the obtained alternating current power to the AC load 38, and causes a reverse flow of the obtained alternating current power to the power system 34. It should be noted that the DC/AC converter 42 does not apply AC/DC conversion to alternating current power supplied from the power system 34 and output the resultant power to the DC bus 53.

The battery-use DC/DC converter 43 applies DC/DC conversion to power reserved in the battery 36 (increases and reduces voltage thereof) and outputs (discharges) the resultant power to the DC bus 53. The battery-use DC/DC converter 43 also applies DC/DC conversion to power supplied via the DC bus 53 and charges the battery 36 with the resultant power.

When the EV 37 is connected to the power control apparatus 32, the EV-use DC/DC converter 44 applies DC/DC conversion to power reserved in the EV 37 and outputs (discharges) the resultant power to the DC bus 53, and also applies DC/DC conversion to power supplied via the DC bus 53 and charges the EV 37 with the resultant power.

The load-use DC/DC converters 45-1 and 45-2 apply DC/DC conversion to power supplied via the DC bus 53 so that the resultant power has voltage necessary for driving the DC loads 39-1 and 39-2 that are connected to the load-use DC/DC converters 45-1 and 45-2, respectively, and supplies the resultant power to the DC loads 39-1 and 39-2, respectively.

The system controller 47 controls the entirety of the energy management system 31 by controlling blocks composing the power control apparatus 32 based on the currents measured by the ammeters 33 and 52-1 to 52-4, the state of power generation by the PV device 35, the charged state of the battery 36, the state of the AC load 38, and the like.

The system controller 47 also controls, for example, the battery-use DC/DC converter 43 to charge or discharge the battery 36 in accordance with the state of the AC load 38.

It should be noted that, in FIG. 3, illustration of wiring that connects the system controller 47 and the blocks is omitted.

For the sake of simplicity, the following description will be given using an exemplary configuration of the energy management system 31 shown in FIG. 4. In the energy management system 31 shown in FIG. 4, constituents that correspond to constituents of the energy management system 31 shown in FIG. 3 are given the same reference numerals thereas.

[Processing for Controlling Charge and Discharge of Battery]

Figure 5:
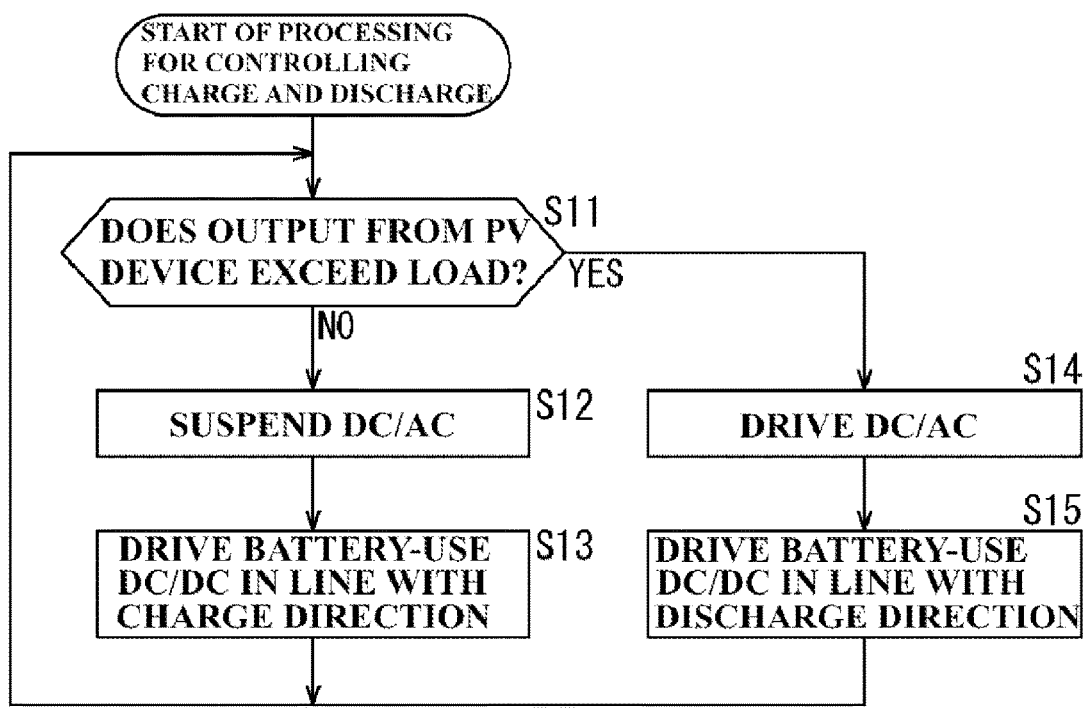
FIG. 5 is a flowchart for describing processing for controlling charge and discharge.

A description is now given of processing for controlling charge and discharge of the battery in the energy management system 31 with reference to a flowchart shown in FIG. 5. This processing for controlling charge and discharge is executed when the DC/DC converter 41 applies DC/DC conversion to power generated by the PV device 35 and outputs the resultant power to the DC bus 53.

In step S11, the system controller 47 determines whether power output from the PV device 35 (power output from the PV-use DC/DC converter 41 to the DC bus 53) exceeds power consumed by the AC load 38.

If it is determined in step S11 that the power output from the PV device 35 does not exceed the power consumed by the AC load 38, processing proceeds to step S12, and the system controller 47 suspends the DC/AC converter 42.

Then, in step S13, the system controller 47 drives the battery-use DC/DC converter 43 in line with a charge direction so as to apply DC/DC conversion to the power output from the PV-use DC/DC converter 41 to the DC bus 53 and charge the battery 36 with the resultant power.

Figure 6:
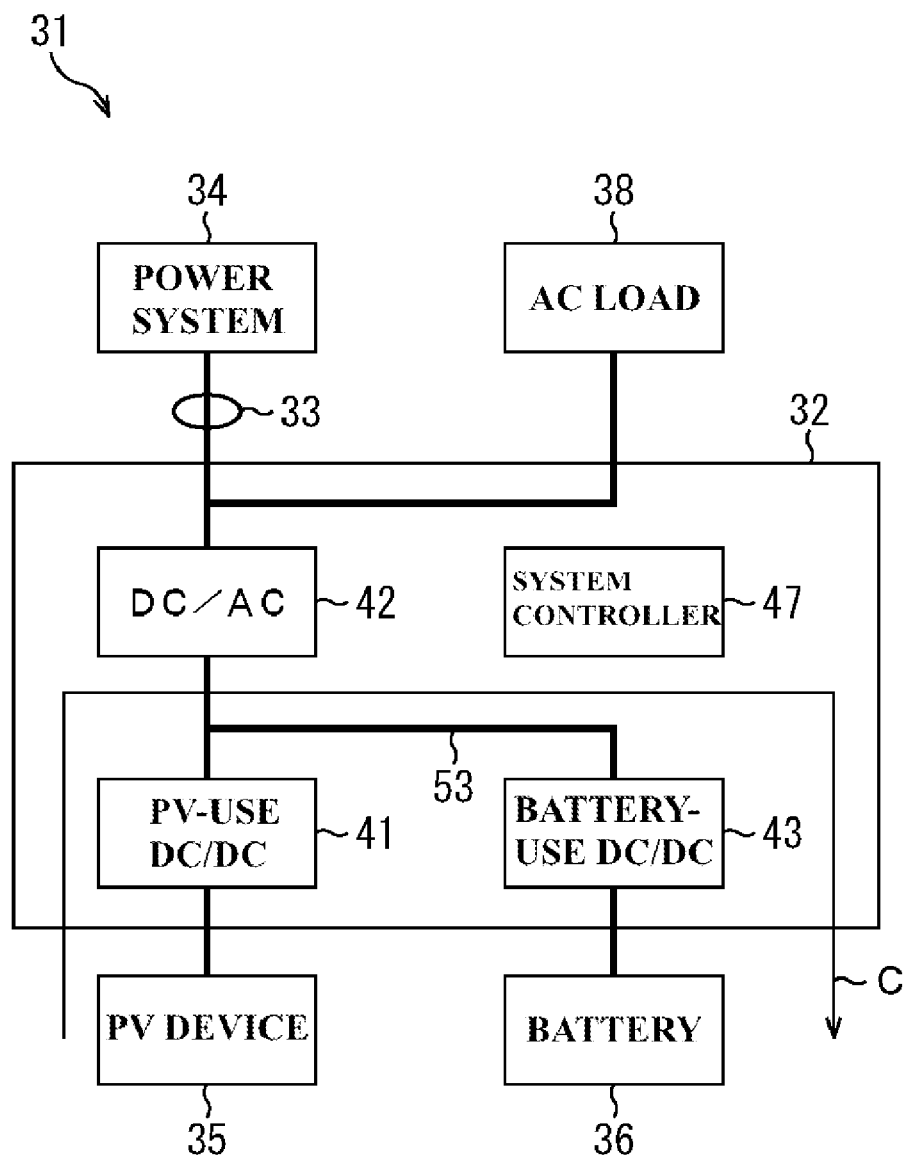
FIG. 6 shows the flow of power at the time of charge.

That is to say, in the energy management system 31, if the power output from the PV-use DC/DC converter 41 is lower than the power consumed by the AC load 38, the PV-use DC/DC converter 41 applies DC/DC conversion to the power generated by the PV device 35 and supplies the resultant power to the battery-use DC/DC converter 43 via the DC bus 53, and then the battery-use DC/DC converter 43 applies DC/DC conversion to the supplied power and charges the battery 36 with the resultant power, as indicated by an arrow C in FIG. 6.

On the other hand, if it is determined in step S11 that the power output from the PV device 35 exceeds the power consumed by the AC load 38, processing proceeds to step S14, and the system controller 47 drives the DC/AC converter 42.

Then, in step S15, the system controller 47 drives the battery-use DC/DC converter 43 in line with a discharge direction so as to apply DC/DC conversion to power stored in the battery 36 and discharge the resultant power to the DC bus 53.

Figure 7:
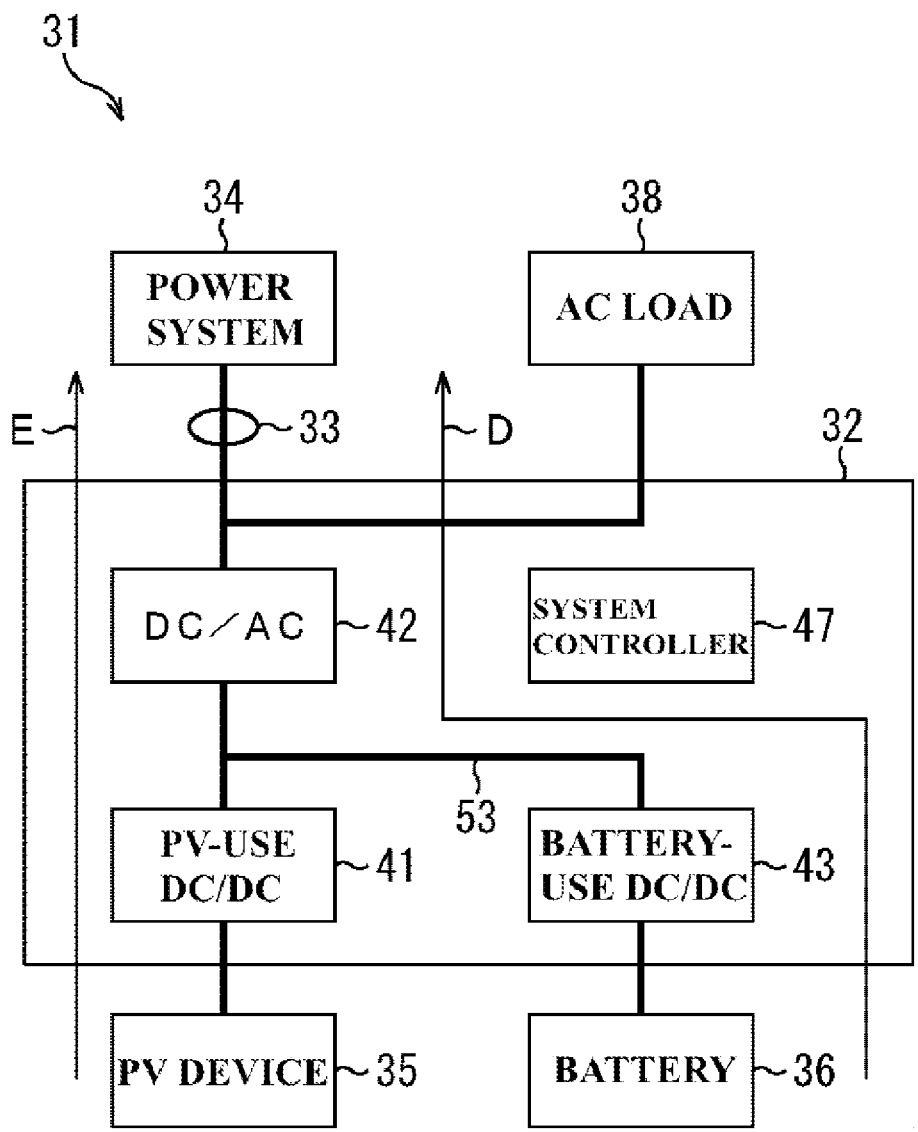
FIG. 7 shows the flow of power at the time of discharge.

That is to say, in the energy management system 31, if the power output from the PV-use DC/DC converter 41 is higher than the power consumed by the AC load 38, the battery-use DC/DC converter 43 applies DC/DC conversion to the power discharged from the battery 36 and supplies the resultant power to the DC/AC converter 42 via the DC bus 53, and then the DC/AC converter 42 applies DC/AC conversion to the supplied power, as indicated by an arrow D in FIG. 7. Furthermore, as indicated by an arrow E in FIG. 7, the PV-use DC/DC converter 41 also applies DC/DC conversion to the power generated by the PV device 35 and supplies the resultant power to the DC/AC converter 42 via the DC bus 53, and then the DC/AC converter 42 applies DC/AC conversion to the supplied power.

At this time, the system controller 47 controls discharge of the battery 36 by the battery-use DC/DC converter 43 so that the power output from the DC/AC converter 42 is higher than the power consumed by the AC load 38.

Through the above-described processing, the power stored in the battery 36 is discharged so that the power output from the DC/AC converter 42 is higher than the power consumed by the AC load 38. Accordingly, the discharged power is not entirety consumed by the AC load 38, and excess power is supplied to the power system 34 as surplus power. In this way, at least a part of the power that has been generated by the PV device 35 and stored in the battery 36 can be sold. Hence, not only can the power generated by the PV be used efficiently, but also the user can earn a profit from selling the power.

Figure 8:
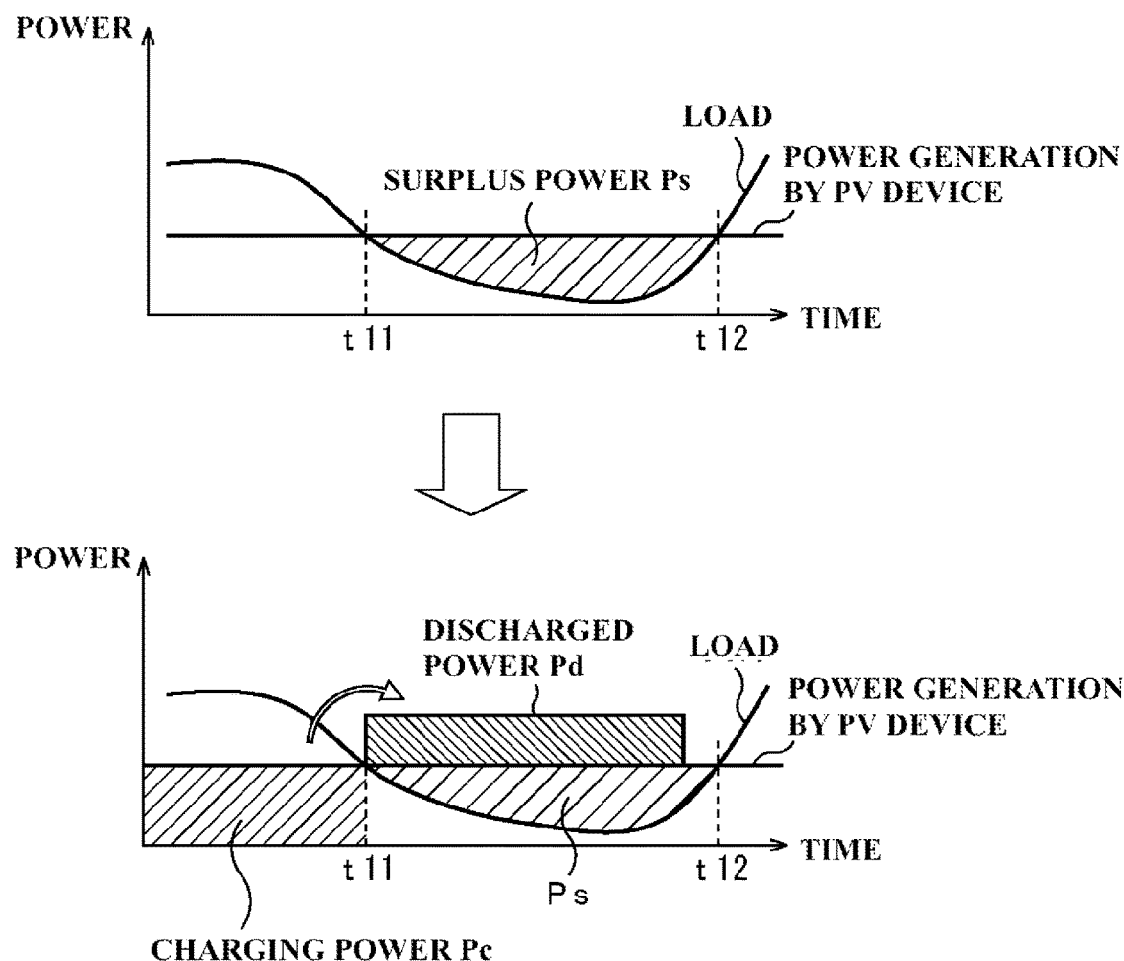
FIG. 8 is a diagram for describing timings of charge and discharge.

Conventionally, at home for example, as shown in the upper level of FIG. 8, when power generated by a PV device is low relative to power consumed by an AC load, e.g., in a time period until time t11, the power generated by the PV device is entirety consumed by the AC load. On the other hand, when the power generated by the PV device is high relative to the power consumed by the AC load, e.g., in a time period from time t11 to time t12, a part of the power generated by the PV device is consumed by the AC load, whereas the rest thereof is supplied to a power system as surplus power Ps.

In contrast, through the above-described processing, as shown in the lower level of FIG. 8, when the power generated by the PV device is low relative to the power consumed by the AC load, e.g., in a time period until time t11, the power generated by the PV device is used as charging power Pc to charge a battery. On the other hand, when the power generated by the PV device is high relative to the power consumed by the AC load, e.g., in a time period between time t11 to time t12, a part of the power generated by the PV device is consumed by the AC load, the rest thereof is supplied to the power system as the surplus power Ps, and the charging power Pc is supplied to the power system as discharged power Pd. In this way, in addition to a part of power generated by the PV device 35, power stored in the battery 36 can be reliably sold. Hence, not only can the power generated by the PV device be used more efficiently, but also the user can earn a larger profit from selling the power.

[Another Example of Processing for Controlling Charge and Discharge]

Figure 9:
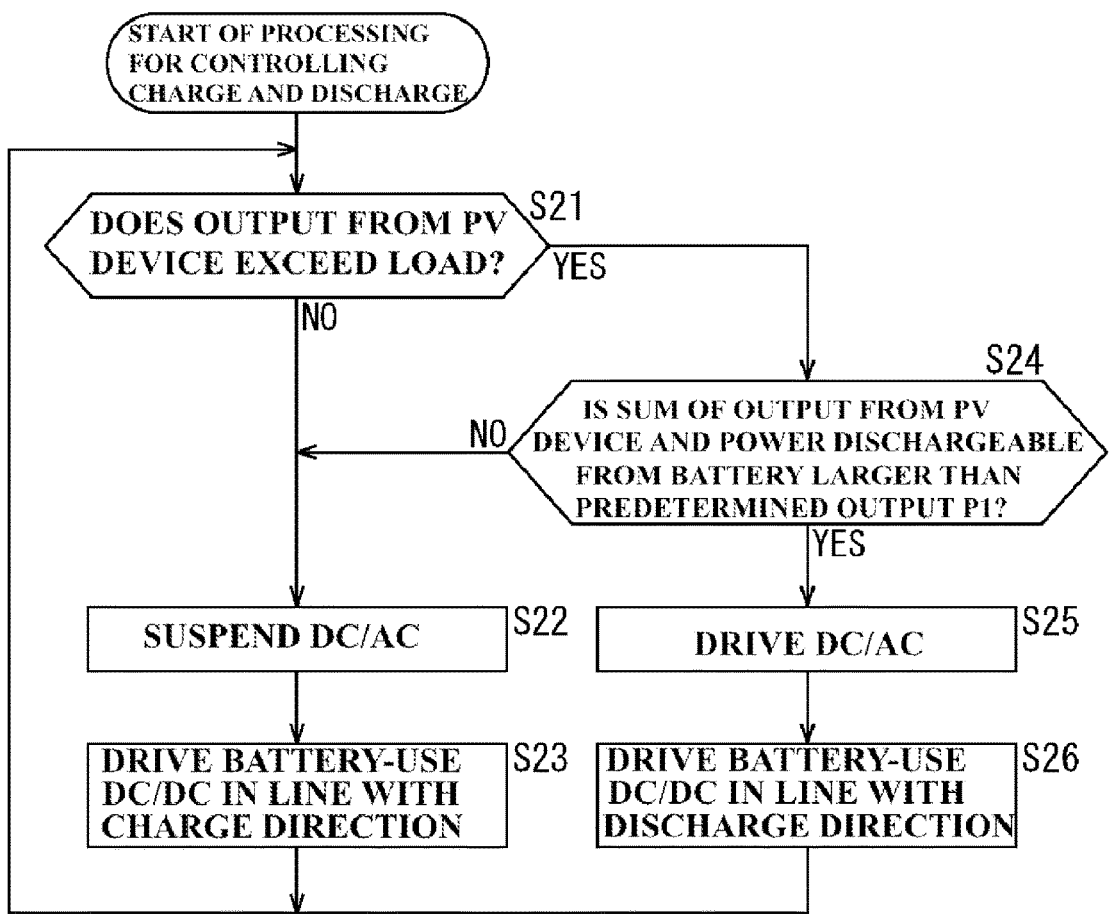
FIG. 9 is a flowchart for describing another example of processing for controlling charge and discharge.

A description is now given of another example of processing for controlling charge and discharge in the energy management system 31 with reference to a flowchart shown in FIG. 9.

It should be noted that the processes of steps S21 to S23, S25, and S26 of the flowchart shown in FIG. 9 are basically similar to the processes of steps S11 to S15 shown in FIG. 5, respectively, and hence a description thereof is omitted.

If it is determined in step S21 that the power output from the PV device 35 exceeds the power consumed by the AC load 38, processing proceeds to step S24, and the system controller 47 determines whether a sum of the power output from the PV device 35 (the power output from the PV-use DC/DC converter 41) and power that the battery-use DC/DC converter 43 can discharge from the battery 36 is larger than predetermined output P1.

Figure 10:
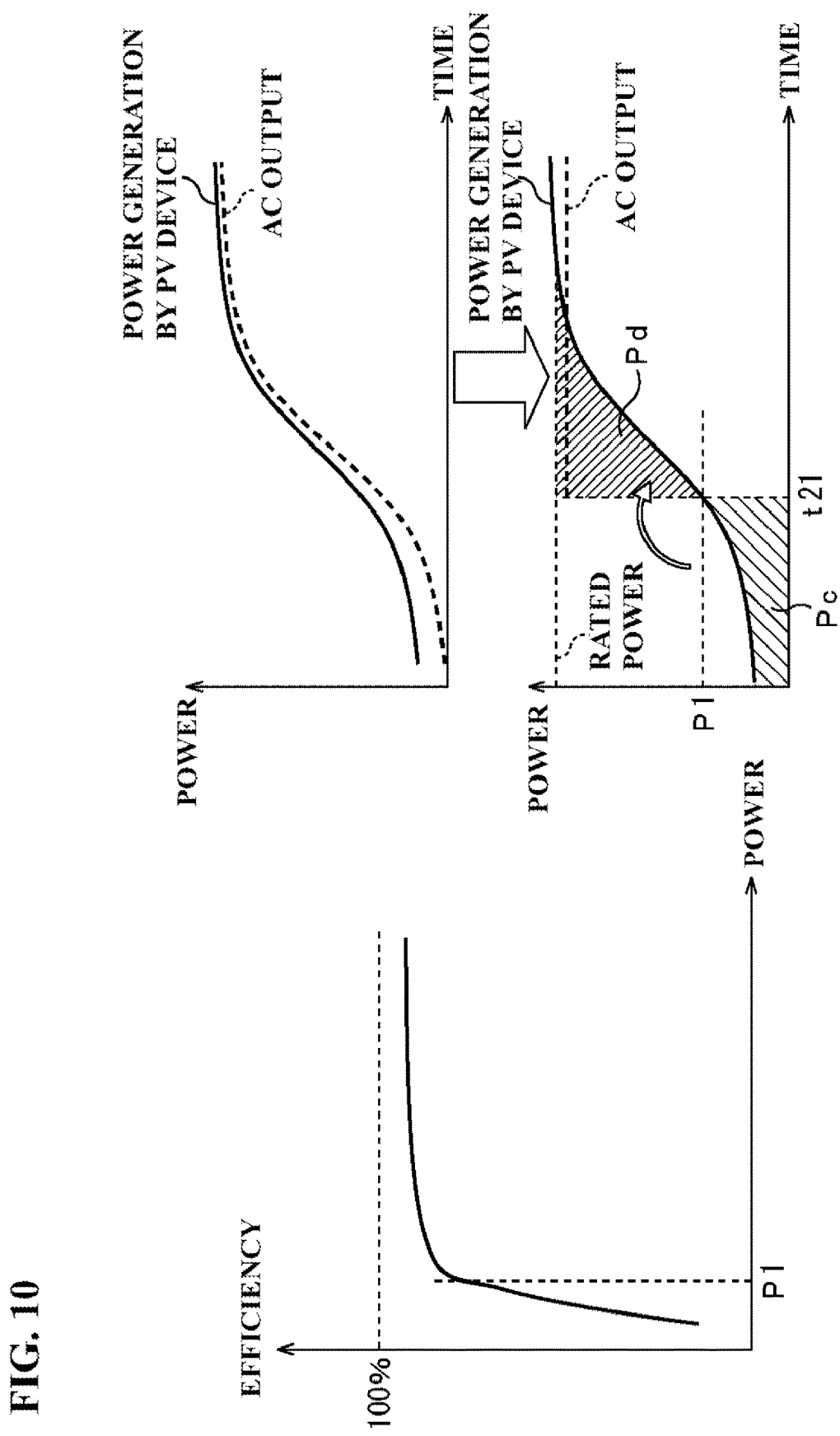
FIG. 10 is a diagram for describing timings of charge and discharge.

As shown in the left side of FIG. 10, the predetermined output P1 denotes power that is necessary for the DC/AC converter 42 to achieve moderately high conversion efficiency, that is to say, power with which the DC/AC converter 42 outputs substantially rated power. When the DC/AC converter 42 applies DC/AC conversion to power lower than the predetermined output P1, the DC/AC conversion loss increases, and the DC/AC conversion efficiency becomes extremely low. In view of this, in step S24, whether the DC/AC conversion loss in the DC/AC converter 42 is smaller than the loss associated with charge of the battery 36 performed by the battery-use DC/DC converter 43 may be determined.

If it is determined in step S21 that the sum of the power output from the PV device 35 and the power dischargeable from the battery 36 is not larger than the predetermined output P1, or that the DC/AC conversion loss in the DC/AC converter 42 is not smaller than (is larger than) the loss associated with the charge performed by the battery-use DC/DC converter 43, processing proceeds to step S22, and then the battery 36 is charged.

On the other hand, if it is determined in step S21 that the sum of the output from the PV device 35 and the power dischargeable from the battery 36 is larger than the predetermined output P1, or that the DC/AC conversion loss in the DC/AC converter 42 is smaller than the loss associated with the charge performed by the battery-use DC/DC converter 43, processing proceeds to step S25, and then the battery 36 is discharged.

It should be noted that, in step S26, the system controller 47 controls discharge of the battery 36 performed by the battery-use DC/DC converter 43 so that the sum of the power output from the PV device 35 and the power dischargeable from the battery 36 is equal to the predetermined output P1.

In general, when power generated by a PV device increases with time, AC output from a DC/AC converter also increases along with the power generated by the PV device, as shown in the upper right portion of FIG. 10. Especially when the power generated by the PV device is low, the efficiency of conversion to AC power decreases, and the conversion loss increases.

In contrast, through the above-described processing, as shown in the lower right portion of FIG. 10, when the power generated by the PV device is low, e.g., in a time period until time t21, the power generated by the PV device is used as charging power Pc to charge a battery, and when a sum of the power generated by the PV device and the charging power Pc is equal to power with which a DC/AC converter outputs substantially rated power at time t21, the charging power Pc is discharged as discharged power Pd. This enables the DC/AC converter to output substantially rated power. As a result, the power generated by the PV device can be used more efficiently.

Although the above has described processing for controlling charge and discharge of the battery 36 in accordance with the state of the AC load 38, an increase and decrease in power consumed by the AC load 38 often take place during fixed time periods of a day.

Therefore, if a time period showing a decrease in the power consumed by the AC load 38 is known at the time of discharge of the battery 36, power discharged from the battery 36 can be sold more reliably.

In view of this, the following describes an example in which a time period showing a decrease in the power consumed by the AC load 38 is learnt, and the battery 36 is discharged in that time period.

[Another Exemplary Configuration of Energy Management System]

Figure 11:
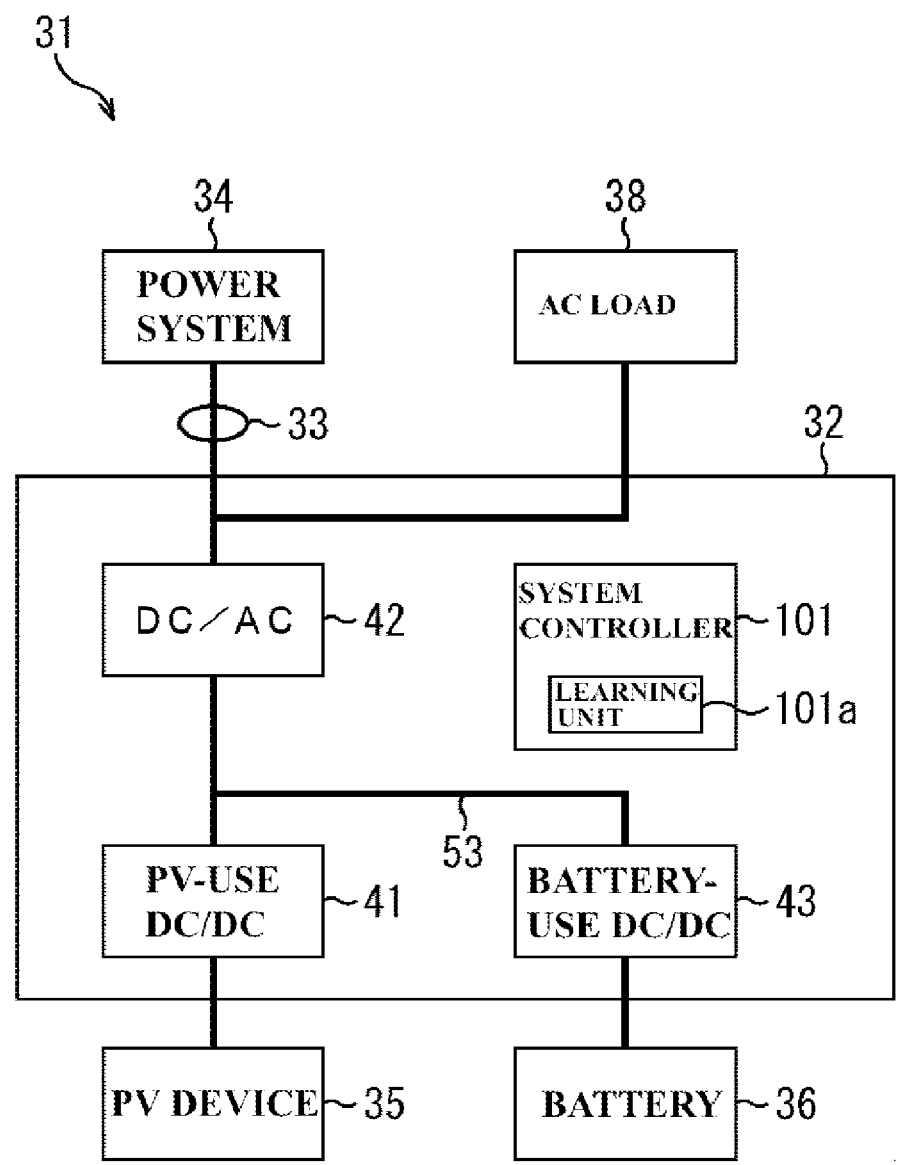
FIG. 11 shows another exemplary configuration of an energy management system.

FIG. 11 is a block diagram showing another exemplary configuration of the energy management system.

Figure 4:
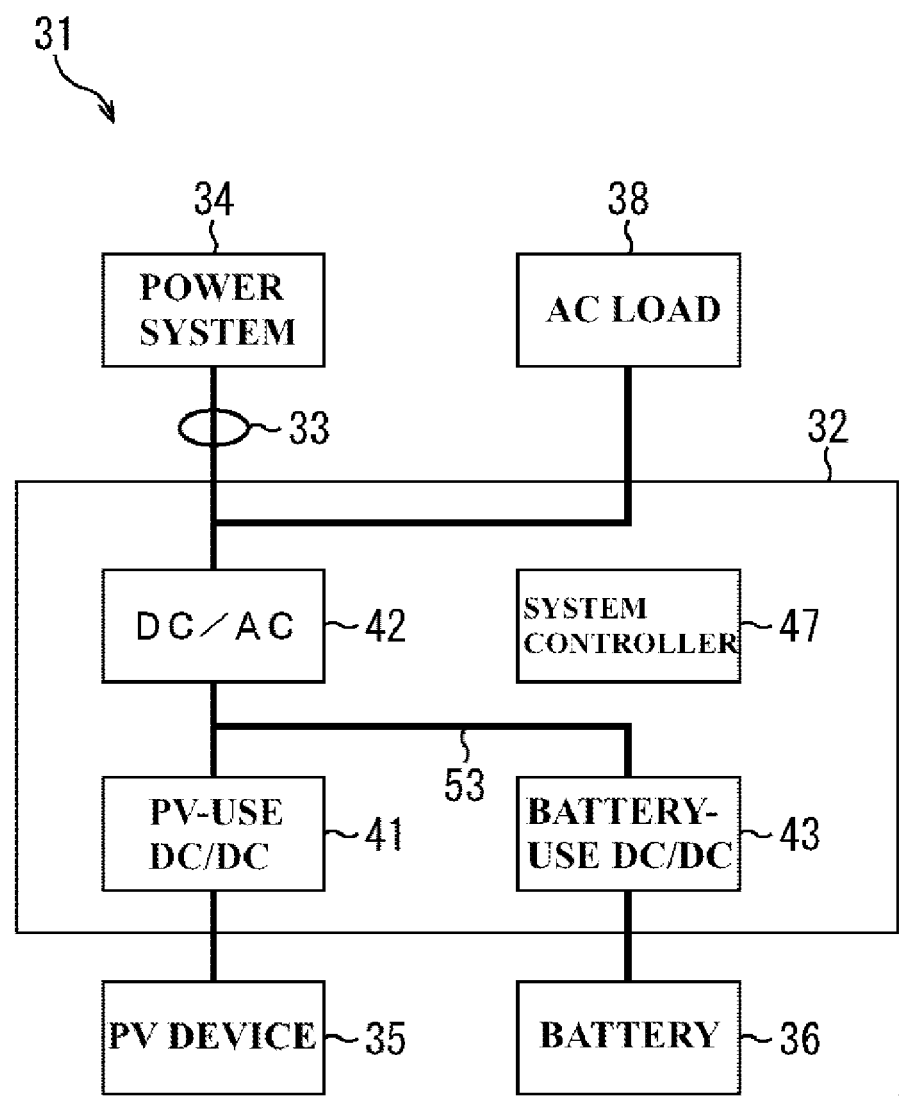
FIG. 4 shows an exemplary configuration of an energy management system in a simplified manner.

It should be noted that, in the energy management system 31 shown in FIG. 11, constituents that correspond to constituents of the energy management system 31 shown in FIG. 4 are given the same reference numerals thereas, and a description thereof is omitted as appropriate.

The energy management system 31 shown in FIG. 11 differs from the energy management system 31 shown in FIG. 4 in that a system controller 101 is provided in place of the system controller 47.

The system controller 101 has functions similar to the functions of the system controller 47 of the energy management system 31 shown in FIG. 4, and also includes a learning unit 101*a*.

The learning unit 101*a* records the following into, for example, a memory in the system controller 101: the time at which the battery-use DC/DC converter 43 applies DC/DC conversion to power output from the PV-use DC/DC converter 41 to the DC bus 53 and charges the battery 36 with the resultant power, and the time at which the battery-use DC/DC converter 43 applies DC/DC conversion to power stored in the battery 36 and discharges the resultant power to the DC bus 53.

[Learning Processing]

Figure 12:
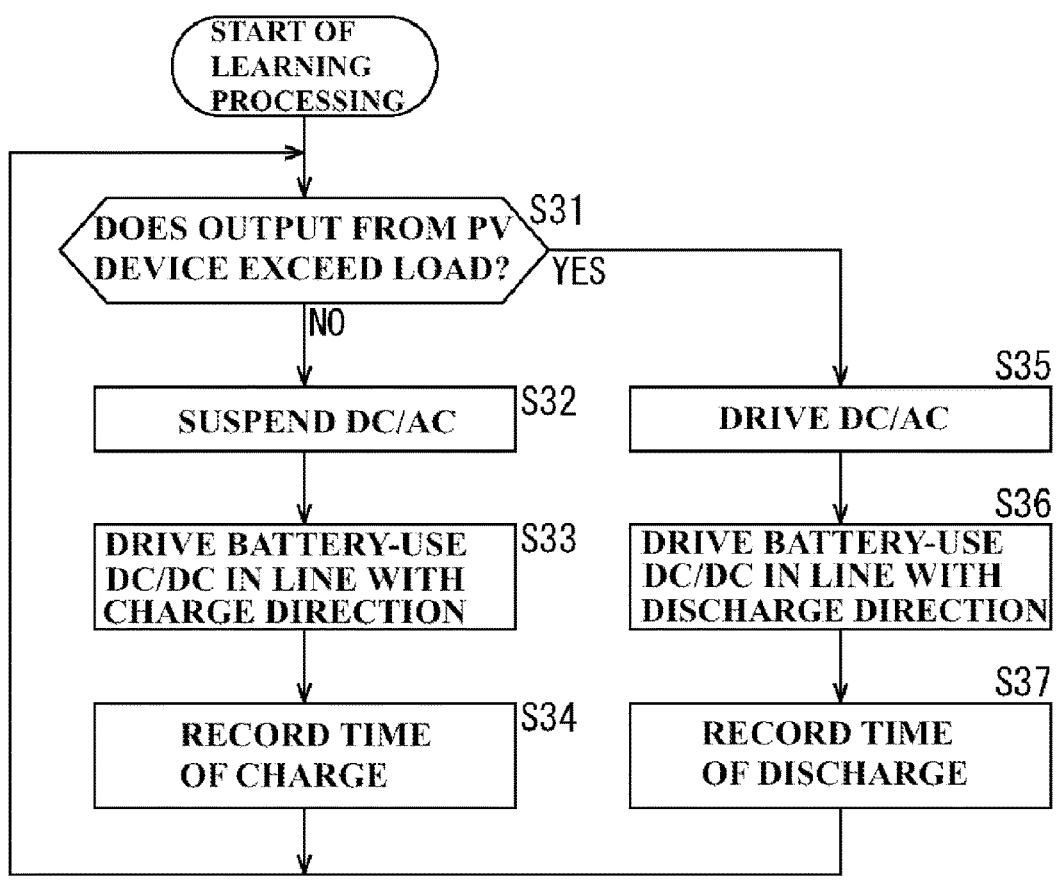
FIG. 12 is a flowchart for describing learning processing.

A description is now given of learning processing in the energy management system 31 shown in FIG. 11 with reference to a flowchart shown in FIG. 12.

It should be noted that the processes of steps S31 to S33, S35, and S36 of the flowchart shown in FIG. 12 are basically similar to the processes of steps S11 to S15 shown in FIG. 5, and hence a description thereof is omitted.

In step S34 that follows step S33, the learning unit 101*a* records the current time as the time at which the battery-use DC/DC converter 43 charges the battery 36. This process is executed when the power output from the PV device 35 (the power output from the PV-use DC/DC converter 41) does not exceed the power consumed by the AC load 38. By recording the time of charge, the learning unit 101*a* learns a time period in which the power consumed by the AC load 38 is higher than the power output from the PV device 35.

On the other hand, in step S37 that follows step S36, the learning unit 101*a* records the current time as the time at which the battery-use DC/DC converter 43 discharges power stored in the battery 36. This process is executed when the power output from the PV device 35 (the power output from the PV-use DC/DC converter 41) exceeds the power consumed by the AC load 38. By recording the time of discharge, the learning unit 101*a* learns a time period in which the power consumed by the AC load 38 is lower than the power output from the PV device 35.

Through the above-described processing, time periods showing a decrease and an increase in the power consumed by the AC load 38 are learnt.

[Example of Processing for Controlling Charge and Discharge]

Figure 13:
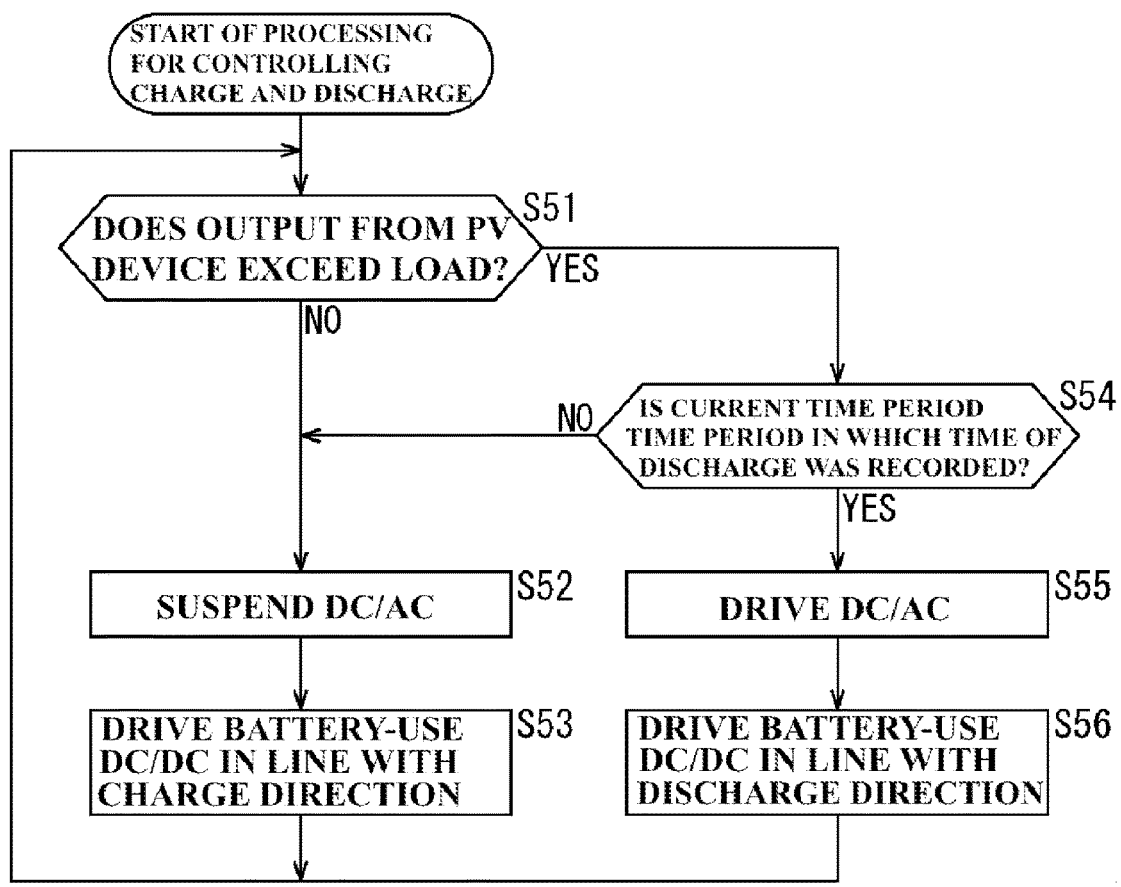
FIG. 13 is a flowchart for describing still another example of processing for controlling charge and discharge.

A description is now given of processing for controlling charge and discharge using the result of learning carried out in the learning processing with reference to a flowchart shown in FIG. 13.

It should be noted that the processes of steps S51 to S53, S55, and S56 of the flowchart shown in FIG. 13 are basically similar to the processes of steps S11 to S15 shown in FIG. 5, and hence a description thereof is omitted.

If it is determined in step S51 that the power output from the PV device 35 exceeds the power consumed by the AC load 38, processing proceeds to step S54, and the system controller 47 determines whether the current time period is a time period in which the learning unit 101*a* recorded the time of discharge, that is to say, a time period showing a decrease in the power consumed by the AC load 38.

If it is determined in step S54 that the current time period is not the time period in which the time of discharge was recorded, processing proceeds to step S52, and then the battery 36 is charged.

On the other hand, if it is determined in step S54 that the current time period is the time period in which the time of discharge was recorded, processing proceeds to step S55, and then the battery 36 is discharged.

Through the above-described processing, the battery 36 is discharged in a time period showing a decrease in the power consumed by the AC load 38. Therefore, the power discharged from the battery 36 can be sold more reliably.

Furthermore, as the learning unit 101*a* also records the time at which the battery 36 is charged, it is possible to prove that the power used to charge the battery 36 is not the inexpensive, nighttime power supplied from the power system 34.

In a case where the amount of sold power is larger than the amount of power generated by the PV device 15 in the above-described energy management system 31, a part of the sold power exceeding the amount of power generated by the PV device 15 is considered to be power supplied (purchased) from the power system 34. That is to say, it is considered that power supplied from the power system 34 has been fraudulently sold.

In view of this, when the amount of power output and supplied from the DC/AC converter 42 to the power system 34 has exceeded the amount of power output from the DC/DC converter 41, the system controller 47 suspends the supply of alternating current power from the DC/AC converter 42 to the power system 34. In this way, it is never considered that power supplied from the power system 34 is fraudulently sold.

The system controller 47 may accumulate the amount of power that was unable to be sold due to output suppression, and make an adjustment so that the amount of power that is sold by way of discharge from the battery 36 does not exceed the accumulated amount. In this way, the power discharged from the battery 36 can be sold without the sale being considered to be fraudulent.

[Still Another Exemplary Configuration of Energy Management System]

Figure 14:
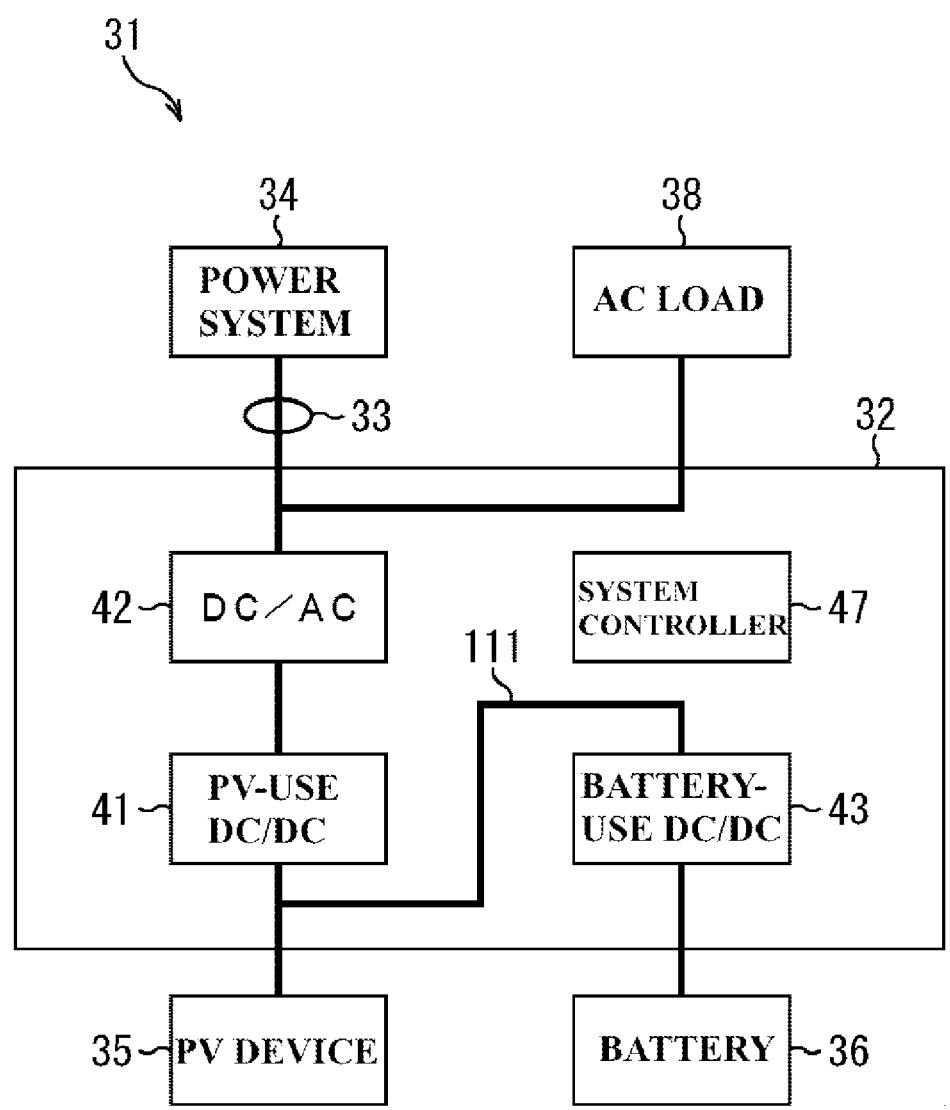
FIG. 14 shows still another exemplary configuration of an energy management system.

In the foregoing description, power generated by the PV device 35 is used to charge the battery 36 via the PV-use DC/DC converter 41, the DC bus 53, and the battery-use DC/DC converter 43. Alternatively, as shown in FIG. 14, the PV device 35 and the battery-use DC/DC converter 43 may be connected by wiring 111, and the power generated by the PV device 35 may be used to charge the battery 36 via the wiring 111 and the battery-use DC/DC converter 43.

This configuration makes it possible to reliably prove that the power used to charge the battery 36 is not the power supplied from the power system 34.

Figure 15:
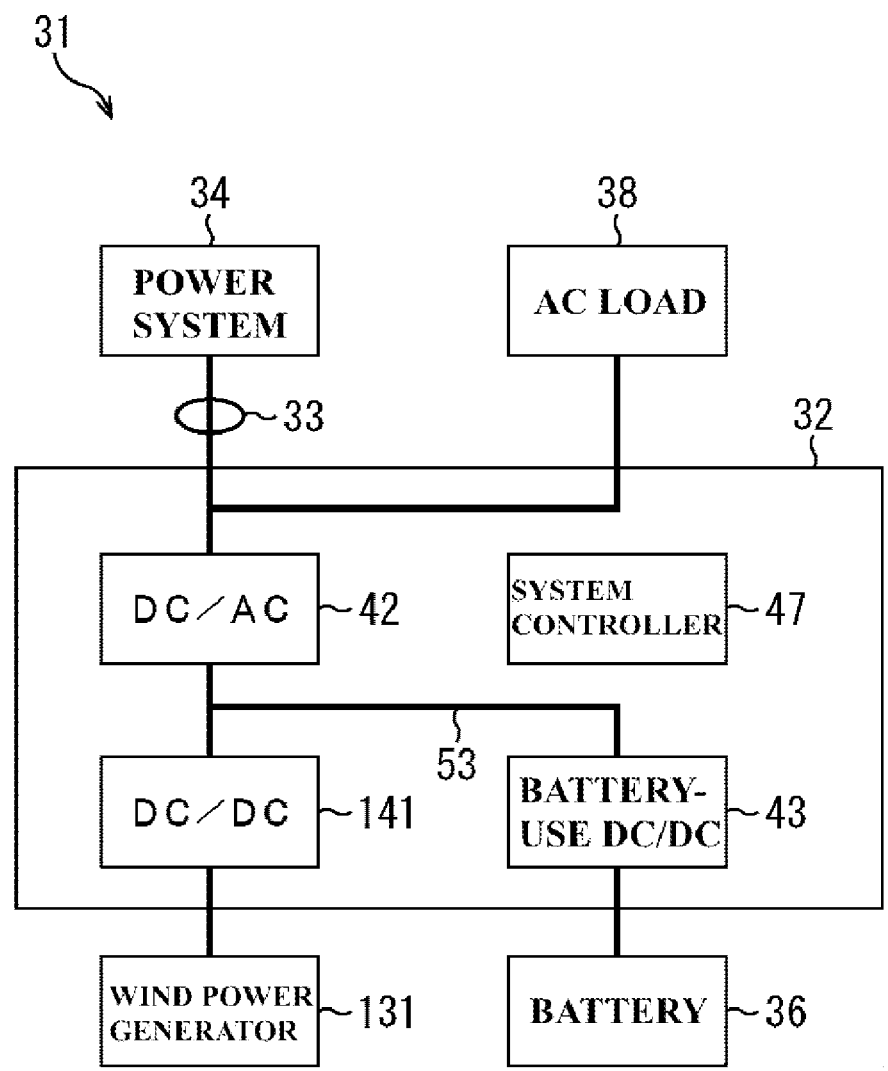
FIG. 15 shows still another exemplary configuration of an energy management system.

Furthermore, in the foregoing description, the PV device 35 that generates power in accordance with the amount of received sunlight is connected to the power control apparatus 32. Alternatively, for example, a wind power generator 131 that generates power using wind power may be connected to the power control apparatus 32 in place of the PV device 35, as shown in FIG. 15. In this case, a DC/DC converter 141 applies DC/DC conversion to the power generated by the wind power generator 131 so that the resultant power has a predetermined voltage, and outputs the resultant power to the DC bus 53.

It should be noted that a power generator, a fuel cell, and the like that generate power using biomass and other forms of natural energy may be connected to the power control apparatus 32 in place of the wind power generator 131.

Incidentally, the above-described processing sequences can be executed not only by hardware, but also by software. In a case where the processing sequences are executed by software, a program composing the software is installed from a recording medium into, for example, a computer built in dedicated hardware, or a general-purpose personal computer that can execute various types of functions by installing various types of programs.

[Exemplary Configuration of General-Purpose Personal Computer]

Figure 16:
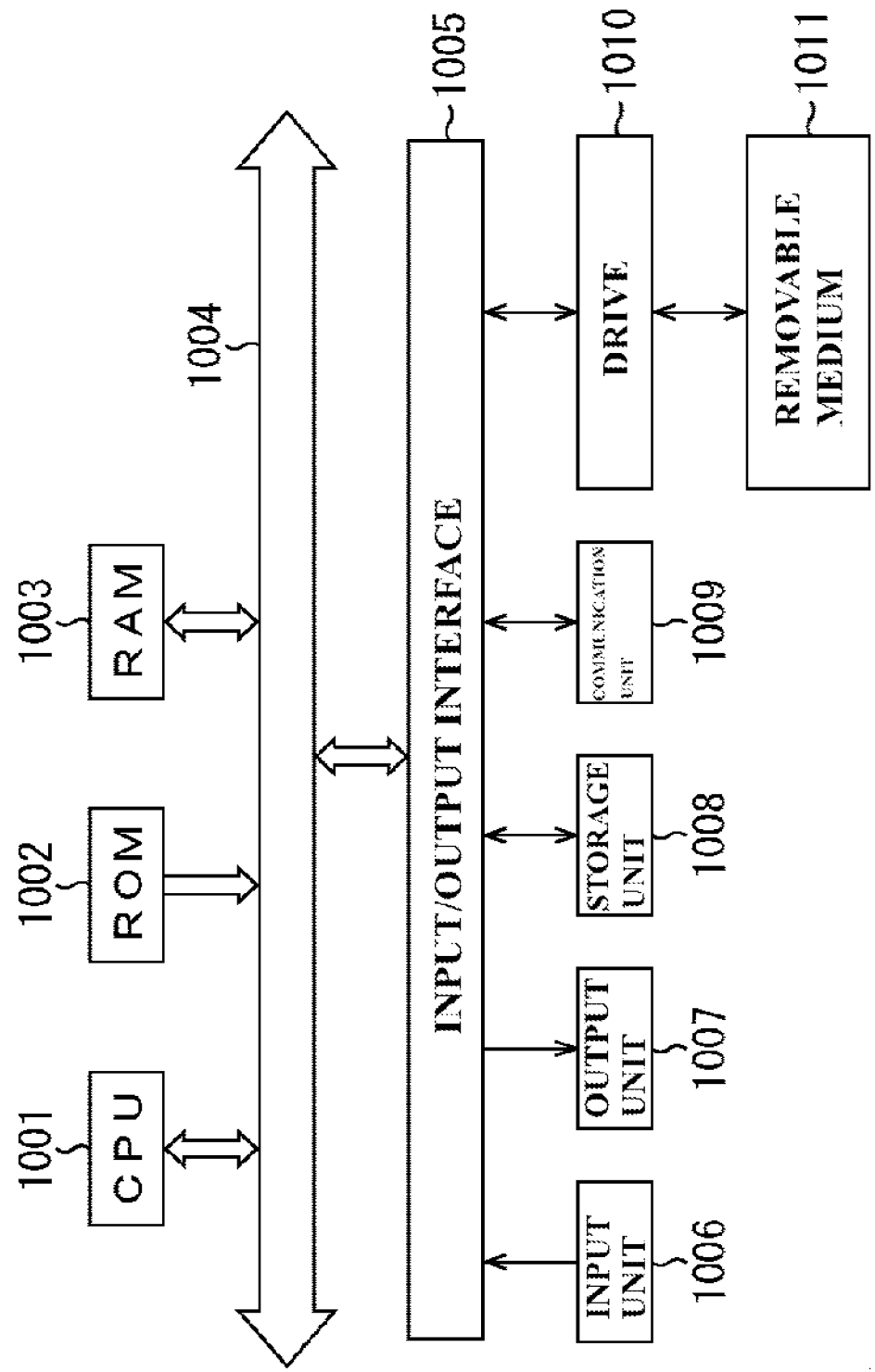
FIG. 16 is a diagram for describing an exemplary configuration of a general-purpose personal computer.

FIG. 16 shows an exemplary configuration of a general-purpose personal computer. This personal computer has a built-in central processing unit (CPU) 1001. An input/output interface 1005 is connected to the CPU 1001 via a bus 1004. A read-only memory (ROM) 1002 and a random-access memory (RAM) 1003 are connected to the bus 1004.

An input unit 1006, an output unit 1007, a storage unit 1008, and a communication unit 1009 are connected to the input/output interface 1005. The input unit 1006 is composed of input devices, such as a keyboard and a mouse, that enable the user to input operation commands. The output unit 1007 outputs images of a processing operation screen and a processing result to a display device. The storage unit 1008 is composed of, for example, a hard disk drive storing programs and various types of data. The communication unit 1009 is composed of, for example, a local area network (LAN) adapter, and executes communication processing via a network, a typical example of which is the Internet. A drive 1010 is also connected that performs reading and writing of data from and to a removable medium 1011 such as a magnetic disk (including a flexible disk), an optical disc (including a compact disc read-only memory (CD-ROM) and a digital versatile disc (DVD)), a magneto-optical disc (including MiniDisc (MD)), and a semiconductor memory.

The CPU 1001 executes various types of processing in accordance with programs stored in the ROM 1002, or programs that have been read from the removable medium 1011 such as a magnetic disk, an optical disc, a magneto-optical disc, and a semiconductor memory, installed into the storage unit 1008, and loaded from the storage unit 1008 to the RAM 1003. The RAM 1003 also stores, for example, data necessary for the CPU 1001 to execute various types of processing as appropriate.

In the computer configured in the foregoing manner, the above-described processing sequences are executed by, for example, the CPU 1001 loading the programs stored in the storage unit 1008 to the RAM 1003 via the input/output interface 1005 and the bus 1004 and executing the loaded programs.

The programs executed by the computer (CPU 1001) can be provided, for example, by recording the same into the removable medium 1011 serving as a packaged medium and the like. The programs can also be provided via a wired or wireless transmission medium such as a local area network, the Internet, and digital satellite broadcasting.

In the computer, the programs can be installed into the storage unit 1008 via the input/output interface 1005 by loading the removable medium 1011 to the drive 1010. The programs can also be received from the communication unit 1009 via a wired or wireless transmission medium and installed into the storage unit 1008. Alternatively, the programs can be preinstalled into the ROM 1002 and the storage unit 1008.

It should be noted that the programs executed by the computer may be processed chronologically in line with the order described in the present specification, may be processed in parallel, or may be processed at necessary timings such as when they are called up. Furthermore, the programs may be processed by one CPU, or may be processed by a plurality of CPUs in the form of distributed processing. It should be noted that, in the present specification, a system denotes the entirety of an apparatus composed of a plurality of apparatuses.

Furthermore, the above-described embodiment is not restrictive, and various changes are possible without departing from the scope of the concept of the present disclosure.

The invention claimed is:

1. A power control apparatus, comprising:
 a first conversion apparatus configured to apply DC/DC conversion to direct current power from a power generator that generates power using natural energy, and output the resultant direct current power;
 a second conversion apparatus configured to apply DC/DC conversion to the power output from the first conversion apparatus and charge a power storage unit with the resultant power, and to apply DC/DC conversion to power from the power storage unit and discharge the resultant power;
 a third conversion apparatus configured to supply alternating current power to a power system and an alternating current load by applying DC/AC conversion to one or both of the power output from the first conversion apparatus and the power discharged by the second conversion apparatus; and
 a controller configured to control driving of the first conversion apparatus, the second conversion apparatus and the third conversion apparatus, wherein
 the controller causes the second conversion apparatus to charge the power storage unit when the power output from the first conversion apparatus is lower than the power consumed by the alternating current load, and causes the second conversion apparatus to discharge the resultant power so that the power output from the third conversion apparatus is higher than power consumed by the alternating current load when the power output from the first conversion apparatus is higher than the power consumed by the alternating current load.

2. The power control apparatus according to claim 1, wherein
 the third conversion apparatus does not apply AC/DC conversion to alternating current power from the power system.

3. The power control apparatus according to claim 1, wherein
 the controller causes the second conversion apparatus to perform the discharge so that a sum of the power output from the first conversion apparatus and the power discharged by the second conversion apparatus is equal to power with which the third conversion apparatus outputs substantially rated power.

4. The power control apparatus according to claim 3, wherein
 the controller causes the second conversion apparatus to perform the charge when a sum of the power output from the first conversion apparatus and power dischargeable by the second conversion apparatus is lower than the power with which the third conversion apparatus outputs the substantially rated power.

5. The power control apparatus according to claim 3, wherein the controller causes the second conversion apparatus to perform the charge when a DC/AC conversion loss in the third conversion apparatus is larger than a loss associated with the charge performed by the second conversion apparatus.

6. The power control apparatus according to claim 1, wherein
the controller
includes a learning unit configured to learn a time period in which the power consumed by the alternating current load is lower than the power output from the first conversion apparatus, and
causes the second conversion apparatus to perform the discharge in the time period learnt by the learning unit.

7. The power control apparatus according to claim 6, wherein
the learning unit learns the time period by recording a time at which discharge is performed by the second conversion apparatus.

8. The power control apparatus according to claim 7, wherein
the learning unit further records a time at which charge is performed by the second conversion apparatus.

9. The power control apparatus according to claim 1, wherein
when an amount of the power output and supplied from the third conversion apparatus to the power system is larger than an amount of the power output from the first conversion apparatus, the controller suspends supply of the alternating current power from the third conversion apparatus to the power system.

10. A power control method for a power control apparatus including:
a first conversion apparatus configured to apply DC/DC conversion to direct current power from a power generator that generates power using natural energy, and output the resultant direct current power;
a second conversion apparatus configured to apply DC/DC conversion to the power output from the first conversion apparatus and charge a power storage unit with the resultant power, and to apply DC/DC conversion to power from the power storage unit and discharge the resultant power; and
a third conversion apparatus configured to supply alternating current power to a power system and an alternating current load by applying DC/AC conversion to one or both of the power output from the first conversion apparatus and the power discharged by the second conversion apparatus,
the power control method comprising:
causing the second conversion apparatus to charge the power storage unit when the power output from the first conversion apparatus is lower than the power consumed by the alternating current load; and
causing the second conversion apparatus to discharge the resultant power so that the power output from the third conversion apparatus is higher than power consumed by the alternating current load when the power output from the first conversion apparatus is higher than the power consumed by the alternating current load.

11. A non-transitory computer readable medium storing a program executed by a computer to control a power control apparatus comprising: a first conversion apparatus, a second conversion apparatus and a third conversion apparatus, the program containing instruction, which, when executed by the computer cause the computer to perform operations comprising:

controlling the first conversion apparatus configured to apply DC/DC conversion to direct current power from a power generator that generates power using natural energy, and output the resultant direct current power;
controlling the second conversion apparatus to apply DC/DC conversion to the power output from the first conversion apparatus and charge a power storage unit with the resultant power, and to apply DC/DC conversion to power from the power storage unit and discharge the resultant power; and
controlling the third conversion apparatus to supply alternating current power to a power system and an alternating current load by applying DC/AC conversion to one or both of the power output from the first conversion apparatus and the power discharged by the second conversion apparatus, wherein
the program instructions further cause the computer to perform operations such that:
controlling the second conversion apparatus to charge the power storage comprises controlling the second conversion apparatus to charge the power storage when the power output from the first conversion apparatus is lower than the power consumed by the alternating current load; and
controlling the second conversion apparatus to discharge the resultant power comprises controlling the second conversion apparatus to discharge the resultant power so that the power output from the third conversion apparatus is higher than a power consumed by the alternating current load when the power output from the first conversion apparatus is higher than the power consumed by the alternating current load.

12. An energy management system, comprising:
a power generator configured to generate power using natural energy;
a power storage unit for storing power;
a direct current bus serving as a path for supplying direct current power;
a first conversion apparatus configured to apply DC/DC conversion to direct current power from the power generator and output the resultant direct current power;
a second conversion apparatus configured to apply DC/DC conversion to the power output from the first conversion apparatus and charge the power storage unit with the resultant power, and to apply DC/DC conversion to power from the power storage unit and discharge the resultant power;
a third conversion apparatus configured to supply alternating current power to a power system and an alternating current load by applying DC/AC conversion to one or both of the power output from the first conversion apparatus and the power discharged by the second conversion apparatus; and
a controller configured to control driving of the first conversion apparatus, the second conversion apparatus and the third conversion apparatus, wherein
the controller causes the second conversion apparatus to charge the power storage unit when the power output from the first conversion apparatus is lower than the power consumed by the alternating current load, and causes the second conversion apparatus to discharge the resultant power so that the power output from the third conversion apparatus is higher than power consumed by the alternating current load when the power output from the first conversion apparatus is higher than the power consumed by the alternating current load.

13. A power control apparatus, comprising:
a first conversion apparatus configured to apply DC/DC conversion to direct current power from a power generator that generates power using natural energy, and output the resultant direct current power;
a second conversion apparatus configured to apply DC/DC conversion to the power output from the first conversion apparatus and charge a power storage unit with the resultant power, and to apply DC/DC conversion to power from the power storage unit and discharge the resultant power;
a third conversion apparatus configured to supply alternating current power to a power system and an alternating current load by applying DC/AC conversion to one or both of the power output from the first conversion apparatus and the power discharged by the second conversion apparatus; and
a controller configured to control driving of the first conversion apparatus, the second conversion apparatus and the third conversion apparatus, wherein
the controller causes the second conversion apparatus to discharge the resultant power so that the power output from the third conversion apparatus is higher than power consumed by the alternating current load, and
the controller causes the second conversion apparatus to discharge the resultant power so that a sum of the power output from the first conversion apparatus and the resultant power discharged by the second conversion apparatus is equal to power with which the third conversion apparatus outputs substantially rated power.

14. A power control apparatus, comprising:
a first conversion apparatus configured to apply DC/DC conversion to direct current power from a power generator that generates power using natural energy, and output the resultant direct current power;
a second conversion apparatus configured to apply DC/DC conversion to the power output from the first conversion apparatus and charge a power storage unit with the resultant power, and to apply DC/DC conversion to power from the power storage unit and discharge the resultant power;
a third conversion apparatus configured to supply alternating current power to a power system and an alternating current load by applying DC/AC conversion to one or both of the power output from the first conversion apparatus and the power discharged by the second conversion apparatus; and
a controller configured to control driving of the first conversion apparatus, the second conversion apparatus and the third conversion apparatus, wherein
the controller causes the second conversion apparatus to discharge the resultant power so that the power output from the third conversion apparatus is higher than power consumed by the alternating current load, and
the controller:
learns a time period in which the power consumed by the alternating current load is lower than the power output from the first conversion apparatus, and
causes the second conversion apparatus to perform the discharge in the learned time period.

15. A power control apparatus, comprising:
a first conversion apparatus configured to apply DC/DC conversion to direct current power from a power generator that generates power using natural energy, and output the resultant direct current power;
a second conversion apparatus configured to apply DC/DC conversion to the power output from the first conversion apparatus and charge a power storage unit with the resultant power, and to apply DC/DC conversion to power from the power storage unit and discharge the resultant power;
a third conversion apparatus configured to supply alternating current power to a power system and an alternating current load by applying DC/AC conversion to one or both of the power output from the first conversion apparatus and the power discharged by the second conversion apparatus; and
a controller configured to control driving of the first conversion apparatus, the second conversion apparatus and the third conversion apparatus, wherein
the controller causes the second conversion apparatus to discharge the resultant power so that the power output from the third conversion apparatus is higher than power consumed by the alternating current load, and
when an amount of the power output and supplied from the third conversion apparatus to the power system is larger than an amount of the power output from the first conversion apparatus, the controller suspends supply of the alternating current power from the third conversion apparatus to the power system.

* * * * *